March 22, 1966 M. M. SEELOFF 3,241,347
APPARATUS FOR MAKING METAL RINGS
Filed July 2, 1962 2 Sheets-Sheet 1

INVENTOR.
MELVIN M. SEELOFF
BY Francis J. Klempay
ATTORNEY

March 22, 1966  M. M. SEELOFF  3,241,347
APPARATUS FOR MAKING METAL RINGS
Filed July 2, 1962  2 Sheets-Sheet 2

INVENTOR.
MELVIN M. SEELOFF
BY Francis J. Klempay
ATTORNEY

United States Patent Office 3,241,347
Patented Mar. 22, 1966

3,241,347
APPARATUS FOR MAKING METAL RINGS
Melvin M. Seeloff, Warren, Ohio, assignor to The Taylor-Winfield Corporation, Warren, Ohio, a corporation of Ohio
Filed July 2, 1962, Ser. No. 206,603
2 Claims. (Cl. 72—301)

This invention relates to an improved method and to an improved production apparatus utilizing the said improved method for forming metal rings. The cross-section of the metal may be round, square, rectangular (including flat) or irregular section, and the invention is characterized by simplicity and speed of operation of the apparatus required, also by extreme accuracy in maintaining the proper circumferential length of the rings being formed, and by the very accurate controlling of the abutting or overlapping of the ends of the workpiece to obtain the highest quality of various fusion welding methods which may be employed on the formed rings.

The primary object of the invention is, as suggested above, the provision of an improved method and simplified apparatus utilizing the method for accurately manufacturing rings of diverse cross-sectional shape in a rapid and inexpensive manner. A secondary object of the invention is the provision of an improved arrangement for loading the straight stock used into the forming apparatus whereby extreme accuracy and uniformity will be maintained in the final product. A further object of the invention is the provision of a simplified and improved forming method and apparatus for the manufacture of rings which can be very expeditiously coupled with various kinds of fusion welding eqipment whereby after the ring are formed by the bending equipment the same are accurately retained and held by the same equipment thru the fusion joining cycle and until the metal has solidified sufficiently to render the rings dimensionally stable.

The above and other objects and advantages of the invention will become apparent upon consideration of the following specification and the accompanying drawing wherein there is disclosed certain preferred embodiments of the invention.

Figure 1:
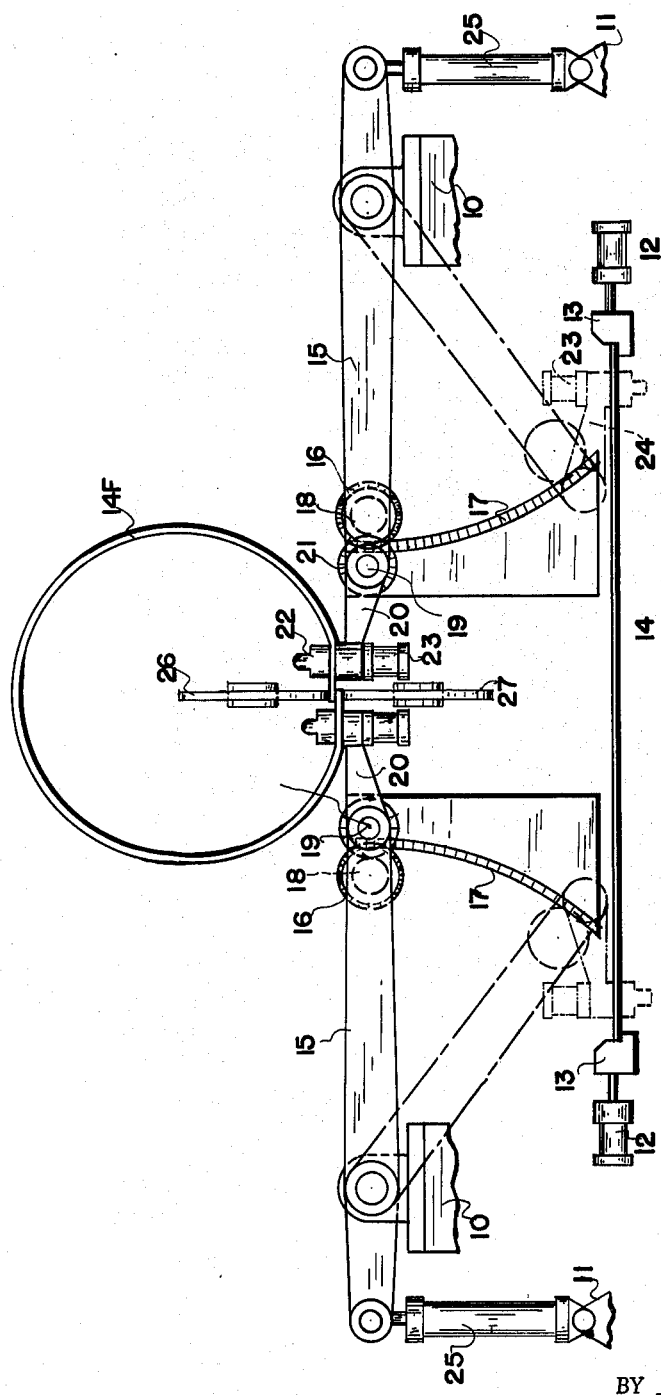
FIGURE 1 is an elevational schematic view of a ring forming machine constructed in accordance with the principles of my invention.

Referring now to FIGURE 1, reference numerals 10 designate fixed pads and reference numeral 11 fixed anchors of a machine frame, not shown. Also mounted on this machine frame is a pair of cylinders 12, the piston rods of which are connected to suitably guided work-locating gage blocks 13. It will be understood, in actual practice, that during a cycle of operation the gage blocks 13 may be first retracted to permit the sidewise loading of a stock length 14 after which the blocks 13 are moved inwardly to predetermined positions to accurately locate the longitudinal position of the stock section 14.

On each of the pads 10 is a lever structure 15 which mounts on its inner end a gear 16 meshing with an arcuate fixed rack 17. Suitably coupled directly with each of the gears 16 is a pinion 18, and these pinions lie in a plane behind the racks 17.

The inner ends of the lever structures 15 also rotatably mount shafts 19 to which are keyed inwardly directed arms 20. Also keyed to these shafts 19 are gears 21 which mesh with pinions 18 coupled with gears 16. It should now be apparent that as the inner ends of the arms 15 move upwardly or downwardly the arms 20 will be swung in an upward or downward direction as the case may be due to the rotational movement imparted by gears 16 thru pinions 18, gears 21, and shafts 19.

The free ends of the arms 20 each carry a clamping structure having a fixed jaw and a movable jaw 22 operated by a fluid cylinder 23. The clamp structure is, of course, C-shaped in end view so that the stock 14 may be loaded into it by sidewise movement of the stock. During a cycle of operation, and assuming that the formed and welded ring 14F has been removed from the clamps 20, 23, while the arms 20 are in upper position as shown in full lines in FIGURE 1, downward movement of the inner ends of the lever structures 15 will cause the arms to swing to lower outer positions as shown in dotted lines at 24. Of course, the sidewise advance of the stock length 14 must be halted a sufficient distance ahead of the path of movement of the arms 20 and clamps 20, 22, 23, to permit clearance for movement of the latter to dotted line positions. During movement of the clamps to their dotted line positions the jaws 22 remain retracted so that immediately upon the clamps reaching their loading positions the stock length 14 may be slid into them sidewise and centered by the cylinders 12 after which the cylinders 23 may be actuated to close the clamps onto the work. Immediately upon completion of this loading operation the blocks 13 may be retracted and the levers 15 pivoted to begin the inwardly and upwardly swinging movement of the arms 24 from the position shown in dotted lines in FIGURE 1 to the position shown in full lines. Suitable means such as the cylinders 25 may be employed to forcibly swing the lever structures 15 and, if desired, suitable but obvious means, not shown, may be utilized in the actual apparatus to synchronize swinging of the levers. It should also be understood that in a practical design the arms 20 and the clamping structures carried thereby are positioned forwardly of the racks 17 to permit swinging movement of these arms.

As the arms 20 and the end positions of the stock piece carried by the clamps thereon swing inwardly and upwardly the stock piece is looped into an upstanding ring as shown at 14F. If an overlapped weld is to be made between the adjacent ends of the formed stock piece as, for example, by the rotary resistance welding electrodes shown at 26 and 27 in FIGURE 1 one of the clamps carried by the arms 20 may be retarded in its movement a very small amount—equal to the thickness of the stock—so that the end edges of the stock piece will not collide with each other. The electrodes 26, 27 or spot welding electrodes, if used, or other fusion welding equipment, if used, may be carried by a suitable machine slide, not shown, which moves normal to the plane of the apparatus depicted in FIGURE 1 and which is preferably mounted to the rear of the apparatus. During the bending cycle the fusion joining equipment is of course retracted to provide clearance for the upwardly looping stock, but immediately upon the ring being formed and while the same is still rigidly held in the clamps 22, 23, the joining equipment may be actuated to fuse the two mating stock ends together. It should be noted that upon completion of the fusion cycle the formed ring may yet be retained, if required, in rigid clamped relation to allow the weld to harden sufficiently to lead dimensional stability to the formed and welded ring. Also, post-weld annealing, peening, and flash trimming or any other operation, commonly used in conjunction with fusion welding may be performed on the ring joint before the ring is released from the clamps. In this connection, it should be observed that the forming apparatus herein described lends itself to such precision in manufacture that the ends of the stock piece may be simply abutted (in the same plane) or precisely spaced at the completion of the forming cycle to enable the joint to be fused together by a flash welding or other fusion welding process whereby there is no overlapping of the metal. Of course, the flash resulting from these operations may be removed by suitable flash trimming means while the product is yet retained rigidly in the clamps.

A particular advantage of the structural arrangement of the apparatus shown in FIGURE 1 is that a large amount of space is left below and above and to either side of the stock clamps upon completion of the bending cycle for the employment of a wide diversity of fusion joining, annealing, peening and flash trimming equipment as may be desired in any particular apparatus. In actual practice, the clamps comprised of the parts 22 and 23 and fixed jaws may be constructed in a flatter shape—i.e. having less vertical height than shown in full lines in FIGURE 1—to provide yet more space for the traverse of the fusion and ancillary equipment.

Figure 3:
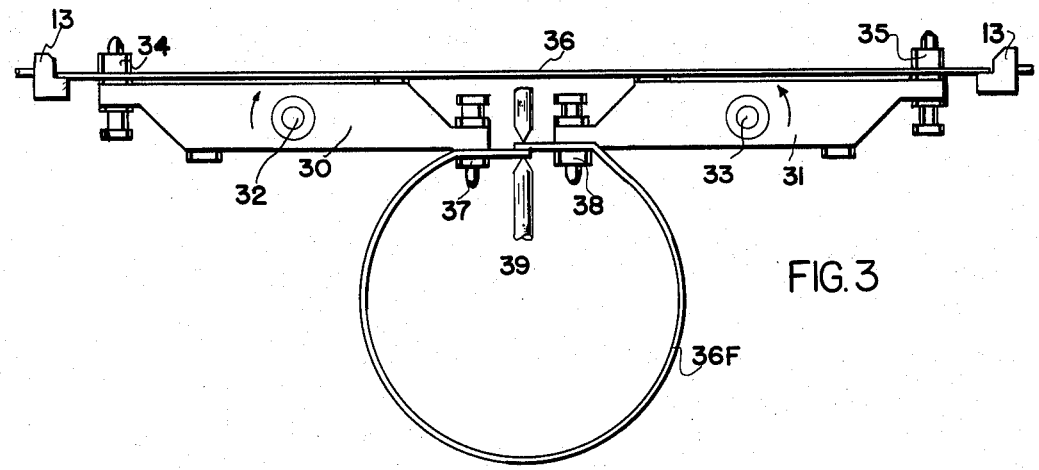
FIGURE 3 is a view of the apparatus of FIGURE 2 but showing the parts thereof in another stage of the operational cycle.
Figure 2:
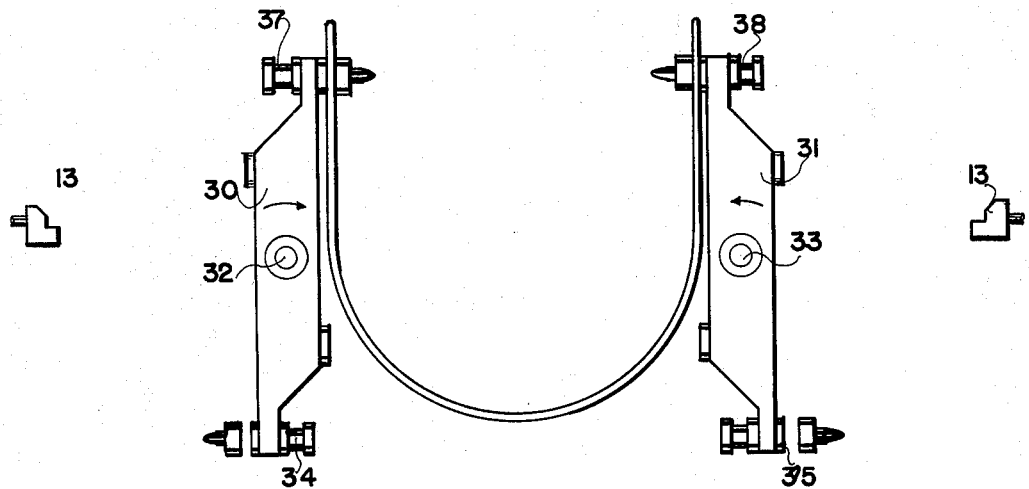
FIGURE 2 is a schematic elevational view of a modified form of ring making machine utilizing the principles of my invention, the view showing an intermediate stage of the bending cycle.

The embodiment of the invention shown in FIGURES 2 and 3 utilizes the same basic principle as the apparatus in FIGURE 1 but has the added advantage of having a double set of stock clamps so that while a formed ring is being held in one set of clamps and is being joined by a spot welding method, for example, the next succeeding stock length may be loaded into the other set of clamps. In this embodiment a higher rate of production in a particular machine may be obtained but the apparatus does have the disadvantage of providing less space in the welding zone which restricts the type of welding and ancillary equipment which may be employed. The apparatus of FIGURES 2 and 3 consists essentially of a pair of arms 30 and 31 which are pivoted on spaced parallel axes 32 and 33. Carried by one end of each of the arms 30, 31 is a first set of air operated clamps 34 and 35 which are operative to clamp a first stock length 36 in a horizontal plane, as viewed in FIGURE 3. Also mounted on the arms 30, 31 and lying in the same vertical plane as the clamps 34, 35 but reversely disposed with respect to the clamps 34, 35 and extending outwardly from opposite surfaces of the arms is a second set of air operated clamps 37 and 38. The sets of clamps 34, 35 and 37, 38 may be cantilevered laterally outward from opposite sides of the arms 30, 31 to position the two workpieces in horizontally spaced vertical planes to facilitate the welding operation shown in FIGURE 3.

As in the first described embodiment, all the stock clamps of the second embodiment disclosed in FIGURES 2 and 3 are essentially C-shaped so that the stock pieces may be loaded into them by sidewise movement. Again and also, slideable locating gage blocks 13 are employed to slideably support the stock pieces in loading and to center the stock pieces accurately with respect to the axes 32, 33 preparatory to closing of the clamps. Suitable power means, not shown, is employed to swing the arms 30, 31 through 180 degrees as required, and suitable stop means, also not shown, is employed to accurately limit the final at-rest position of these arms. In FIGURE 3, spot welding electrodes, shown schematically at 39, are employed to weld together the closed ends of the stock pieces after completion of forming.

It should be apparent upon consideration of the above that while a formed ring as shown at 36F, for example, is being welded or stitched together by any of the processes described above in connection with the embodiment of FIGURE 1, the next succeeding stock piece, as shown at 36, may be loaded into the other pair of stock clamps. After the formed ring 36F is joined and the joint processed as desired or permitted the clamps 37, 38 may be released to eject the completed ring and immediately thereafter the arms 30, 31 may be rotated in directions shown by the arrows to form a new ring and to move the clamps 37, 38 to upper positions preparatory to receiving the next succeeding workpiece. As in the case of the first described embodiment the end portions of the workpieces in FIGURES 2 and 3 may be either overlapped as described or be simply abutted or precisely spaced and then joined by other fusion processes than spot welding. Also as in the case of the first described embodiment, it is desirable to synchronize the swinging movement of the arms 30, 31, which may be accomplished by a number of expedients well known in the machine building art.

It should now be apparent I have provided an improved method and improved and simplified apparatus for carrying out the method which may very rapidly and accurately manufacture rings from precut sections of straight stock of a wide diversity of cross-sectional shapes. Since the stock pieces are continuously held adjacent their ends from loading through joining and subsequent trimming or strength hardening the circumferential dimensions of the formed rings remains absolutely accurate and uniform. While some unwanted bending may occur at the clamps subsequent rolling, sizing or other re-forming will restore the rings to desired diameters in an accurate manner since the peripheral dimension never varies. In many cases the peripheral dimension is not as important as the degree of abutment or the amount of overlap of the ends of the workpiece. This is particularly true where the workpieces are not cut to exact length. It is apparent that my invention provides means for locating and clamping the workpieces so that the degree of abutment or the amount of overlap can be consistently and accurately maintained.

A particular advantage of the method and apparatus of the invention is that the absence of mandrels, rolls, etc., greatly simplifies the machinery making it economical to produce and rugged and long lasting in service. Further the lack of any apparatus within the open space of the formed ring permits the use of a wide diversity of joining and subsequently working devices. These devices may be quick acting so that a high rate of production is attainable. Since many changes may be made in the specific apparatus utilized to carry out the principles of my invention without departing from the spirit or scope thereof reference should be had to the appended claims in determining the scope of the invention.

I claim:
1. Apparatus for making rings comprising a pair of pivoted arms mounted on spaced parallel axes and each swingable through 180° whereby ends of said arms may move from positions extending away from each other to positions adjacent and toward each other, a stock clamp on each of said ends of said arms and operative to clamp a straight piece of stock at points adjacent to but spaced from the ends thereof, the arrangement being such that with a stock piece being so clamped and said arms thereafter rotated through 180° the stock piece will be formed into a ring with end portions of the stock piece being placed in predetermined relation to one another, said arms being pivoted on the free ends of a second pair of arms, means pivotally mounting said second arms for swinging movement about parallel axes spaced outwardly from the first mentioned axes and parallel thereto, power means to swing said second arms, and means operative upon swinging movement of said second arms to cause said first mentioned arms to swing relative to said second arms.

2. Apparatus according to claim 1 further characterized in that said means to cause comprises an arcuate gear rack adjacent the free end of each of said second arms, and a pinion gear journaled on each of said free ends and meshing with said gear racks to swing the first mentioned arm mounted on the second arm.

References Cited by the Examiner

UNITED STATES PATENTS

| | | | |
|---|---|---|---|
| 1,190,902 | 7/1916 | Hood | 219—64 |
| 3,004,584 | 10/1961 | Fuchs et al. | 153—44 |
| 3,065,328 | 11/1962 | Brown | 219—64 |

FOREIGN PATENTS

| | | |
|---|---|---|
| 569,226 | 1/1933 | Germany. |
| 505,866 | 5/1939 | Great Britain. |

RICHARD M. WOOD, *Primary Examiner*.